UNITED STATES PATENT OFFICE 2,520,104

(BETA-NITROALKYL) AMINES AND METHODS FOR PRODUCTION OF SAME

Carl T. Bahner, Jefferson City, Tenn.

No Drawing. Application May 1, 1947,
Serial No. 745,231

11 Claims. (Cl. 260—584)

This invention relates to (beta-nitroalkyl)-amines and methods for their production. More particularly, it relates to the manufacture of compounds of the formula

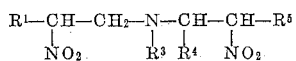

wherein $R^1$ and $R^5$ represent alkyl, $R^4$ is a substituent selected from a group consisting of hydrogen and alkyl and $R^3$ is a substituent selected from a group consisting of alkyl, 2-nitroalkyl and hydroxyalkyl, $R^3$ being nitroalkyl only when $R^4$ is hydrogen.

Among the novel products of my invention may be cited the following: tris(2-nitrobutyl)amine, N,N-bis(2-nitrobutyl)butylamine, N,N-bis(2-nitropropyl)-2-amino-1-ethanol, N,N-bis(2-nitrobutyl)-2-amino-1-ethanol, N-(2-nitrobutyl)-N-(2-nitropentyl)ethylamine.

The products of my invention are obtained from the reaction of ammonia and amines having the general formula

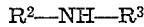

where $R^2$ is selected from the group consisting of hydrogen and alkyl, and $R^3$ is selected from the group consisting of hydrogen, alkyl, hydroxyalkyl, and 2-nitroalkyl, with nitroalkenes having the formula

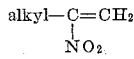

and recovering the resulting 2-nitroalkylamine, the nitroalkene and the amine compound being reacted in the molecular proportions of from about 1:1 to 3:1, depending upon the number of hydrogen atoms attached to the nitrogen atom of the amine and the end product desired.

My invention further relates to the novel products of the foregoing reactions, which include a new series of poly(2-nitroalkyl)amines having the general formula

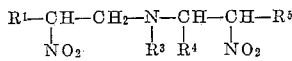

wherein $R^1$ and $R^5$ represent alkyl, $R^4$ is a substituent selected from a group consisting of hydrogen and alkyl and $R^3$ is a substituent selected from a group consisting of alkyl, 2-nitroalkyl and hydroxyalkyl, $R^3$ being nitroalkyl only when $R^4$ is hydrogen.

Among the nitroalkenes suitable for use in my process may be mentioned the following: 2-nitro-1-propene, 2-nitro-1-butene, 2-nitro-1-decene, 2-nitro-5-methyl-1-hexene, and 2-nitro-1-pentene.

Among the amine compounds suitable for use in my process may be mentioned ammonia, methylamine, dimethylamine, ethylamine, diethylamine, 2-hydroxyethylamine, isopropylamine, n-butylamine, n-hexylamine, di-n-butylamine, 2-ethylhexylamine, 3-amino-4-nitroheptane, and N-(1-nitro-2-pentane)butylamine.

In the past, a very limited group of (nitroalkyl)amines have been prepared by indirect means, such as by first reacting an alkyl or aryl amine with formaldehyde, and then reacting the resulting product with a nitroparaffin. I have now discovered that (beta-nitroalkyl)amines may be obtained directly by the reaction of nitroalkenes of the types disclosed above with ammonia, alkylamines, and certain beta-nitroalkylamines, which are clearly delineated in the previous statements.

In carrying out the reaction between nitroalkenes and amines, I prefer first to introduce the amine into a suitable reaction vessel equipped with an efficient stirring device and with means for heating and cooling the contents thereof. The amine may be dissolved in an inert or unreactive solvent, such as an alcohol, an ether, or a cyclic ether, to help in maintaining the mobility of the reaction mixture and to assist in heat transfer. The nitroalkene, either alone or similarly dissolved, is then added gradually with efficient stirring, and the contents of the reaction vessel are meanwhile preferably maintained at or below room temperature. The reaction is generally quite rapid, so that the process can ordinarily be completed within 15 to 30 minutes, if the cooling means is capable of holding the temperature at the desired level. The specified temperature range is preferable, since at higher temperatures, nitroalkenes tend to polymerize and, of course, the temperature should be kept below those at which polymerization of the nitroalkenes tend to occur. But it will be apparent that my process is operative to some extent at temperatures substantially above room temperature. Temperatures below about 50° C. are satisfactory. After the reaction is completed, the solvent is removed by evaporation or distillation, and the product may be isolated in a number of ways, such as by crystallization or distillation, or by preparation and crystallization of the hydrochloride.

In carrying out the reaction between ammonia and nitroalkenes, an aqueous solution of ammonia may be used; however, I prefer to pass ammonia gas into a solution of the nitroalkene in ether or other suitable inert solvent.

The maximum ratio in which nitroalkenes may be made to react with ammonia or amines varies, as disclosed in the following table:

| Amine Compound | Molar ratio, Nitroalkene:Amine |
|---|---|
| NH₃ | Three. |
| Primary | Two. |
| Secondary | One. |

In the processing of primary amines, I have found it possible to add an equimolar ratio of a certain nitroalkene, and after the reaction is complete, then to add another nitroalkene in equimolar proportion, thereby giving a tertiary amine wherein the substituent groups are all different. Similarly, in the condensation of ammonia with nitroalkenes, it is possible successively to add three different nitroalkenes, giving a tris(nitroalkyl)amine wherein the nitroalkyl groups are all different. It will be noted that in my process the nitroalkene and the amine are reacted in molecular proportions of about 3 moles or less of nitroalkenes to 1 mole of amine, depending upon the number of hydrogen atoms connected to the nitrogen atom of the amine and the end product desired.

The following specific examples will further illustrate my invention:

*Example I*

Ammonia reacted with 2-nitro-1-butene in 1:3 molar ratio to produce tris(2-nitrobutyl)amine:

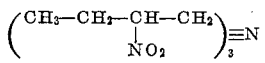

To 133 ml. of aqueous 28% ammonia (2 moles NH₃) were added 20.2 grams of 2-nitro-1-butene (0.2 mole) with vigorous stirring and with cooling to hold the temperature of the reaction mixture between 5 and 10° C. The nitroalkene reacted almost instantly to produce a clear solution. The solution was allowed to stand in an evaporating dish in a current of air until most of the ammonia had escaped. During the evaporation, the product, a bright-red, oily material, settled to the bottom. After being dried over magnesium sulfate, it was found to have a specific gravity ($d_4^{25}$) of 1.118 and an index of refraction ($n_D^{25}$) of 1.469. Analysis after distillation: calculated for $$C_{12}H_{24}N_4O_6$$

44.98% carbon, 7.55% hydrogen, 17.49% nitrogen; found: 46.08% carbon, 7.50% hydrogen, 17.04% nitrogen.

*Example II*

One-tenth mole (10.1 grams) of 2-nitro-1-butene was added in small increments to 0.05 mole (3.66 grams) of n-butylamine at a temperature between 15 and 35° C. An immediate rise in temperature followed the addition of each nitroalkene increment until all of the 0.1 mole of nitroalkene had been added. Further additions of nitroalkene to a small portion of the reaction mixture did not cause a rise in temperature. It was apparent, therefore, that the reaction was complete after two moles of the nitroalkene had reacted with one mole of the primary amine. The product was N,N-bis(2-nitrobutyl)butylamine:

*Example III*

Di-n-butylamine reacted with 2-nitro-1-butene in equimolar ratio to form N-(2-nitrobutyl)dibutylamine:

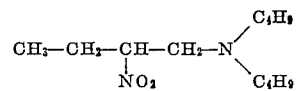

One-tenth mole of di-n-butylamine was added slowly to one-tenth mole of 2-nitro-1-butene. Heat was evolved and the lachrymatory odor of the nitroalkene disappeared. The expected product, boiling at 80–82° C. at 4 mm. Hg. was obtained in nearly quantitative yield.

*Example IV*

N,N-bis(2-nitrobutyl)-2-amino-1-ethanol was prepared by adding 130 parts of 2-nitro-1-butene (1.29 moles) in small portions to 40 parts of 2-amino-1-ethanol (0.67 mole) during a period of 30 minutes. Evolution of heat which occurred after each portion of nitroolefin was added indicated that reaction was almost instantaneous and the nitroolefin odor persisted only a short time. A water bath was employed to keep the temperature of the reaction mixture near room temperature. The viscous, liquid product distilled, with some decomposition, at about 85° C. at about 1.5 mm. pressure.

*Example V*

N-(2-nitrobutyl)-N-(4-nitro-3-heptane)-2-amino-1-ethanol was prepared by adding 101 parts by weight of 2-nitro-1-butene (1 mole) in small portions to 204 parts by weight of N-(4-nitro-3-heptane)-2-amino-1-ethanol (1 mole) during a period of about 20 minutes. A rise in temperature occurred following the addition of each nitroalkene increment and a cold water bath was employed to keep the temperature of the reaction mixture between 25° and 50° C. The nitroalkene odor disappeared within a few minutes. The product is a viscous liquid having a faint amine odor.

In the above specific examples the nitroalkenes are mixed with the amine compounds in molecular proportions ranging from about 2 to 1 to 1 to 10 although the moles which react are within the range of from 1:1 to 3:1, depending upon the product desired and the number of hydrogen atoms attached to the nitrogen atom of the amine compounds, as mentioned previously.

While the above examples illustrate the preferred embodiments of my invention, it will be understood that departures may be made therefrom within the scope of the description and claims. In general it may be said that any modifications or equivalents that would ordinarily occur to those skilled in the art are to be considered as lying within the scope of my invention.

The (beta-nitroalkyl)amines of my invention are useful in numerous fields. Thus, for example, (beta-nitroalkyl)amines containing lower alkyl groups and a plurality of nitro groups may be used as explosives or as intermediates in the manufacture of additives for Diesel fuel. Reduction of the nitro groups to amino groups yields compounds which are of value in the preparation of detergents. Tris(beta-aminoalkyl)amines of this type are particularly useful for the introduction of 3-dimensional linkages in the synthesis of plastics. The reduction of products of my invention having nitro groups at the ends of chains gives diamino compounds that are particularly useful in the preparation of linear polymers of the nylon type. Tertiary alkylamines having a primary amino group on one of the alkyl radicals have found use in chemotherapy, especially in the production of antimalarials. Owing to the presence of the nitro groups in my compounds, it will be apparent that they may be converted into oximes, hydroxylamines, ketones, and nitro alcohols. Numerous uses for such compounds will readily occur to those skilled in the art.

In accordance with the foregoing specification, I claim as my invention:

1. Poly-(2-nitroalkyl)amines having the general formula

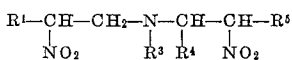

where $R^1$ and $R^5$ represent alkyl, $R^4$ is a substituent selected from a group consisting of hydrogen and alkyl and $R^3$ is a substituent selected from a group consisting of alkyl, 2-nitroalkyl and hydroxyalkyl, $R^3$ being nitroalkyl only when $R^4$ is hydrogen.

2. N-(2-nitrobutyl)-N-(4-nitro-3-heptane)-2-amino-1-ethanol.

3. Tris(2-nitrobutyl)amine.

4. N,N-bis(2-nitrobutyl)butylamine.

5. N,N-bis(2-nitrobutyl)-2-amino-1-ethanol.

6. In the manufacture of 2-nitroalkylamines, the process which comprises mixing, while maintaining the mixture at a temperature not substantially exceeding 50° C., an amine compound having the formula

wherein $R^2$ represents a substituent selected from a class consisting of hydrogen and alkyl, and $R^3$ represents a substituent selected from a class consisting of hydrogen, alkyl, hydroxyalkyl and 2-nitroalkyl, with a nitroalkene having the formula

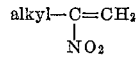

and recovering the resulting 2-nitroalkylamine, the nitroalkene and the amine compound being reacted in the molecular proportions of from abount 1:1 to 3:1, depending upon the number of hydrogen atoms attached to the nitrogen atom of the amine and the end product desired.

7. The process of claim 6 in which the reaction is carried out in the presence of an inert, unreactive solvent.

8. The process of claim 6 wherein the molar ratio of nitroalkene to amine compound is up to about 3 to 1.

9. A process for producing tris(2-nitrobutyl)-amine which comprises agitating a solution of 2-nitro-1-butene in an inert solvent, passing ammonia into said solution while cooling to maintain the reaction mixture at temperatures not substantially exceeding 50° C., and separating tris(2-nitrobutyl)amine from the reaction mixture, the nitrobutene and ammonia being reacted in the molecular proportions of about 3 to 1.

10. A process for producing N,N-bis(2-nitrobutyl)butylamine which comprises adding 2-nitro-1-butene to n-butylamine, with stirring and cooling to maintain the reaction mixture at temperatures not substantially exceeding 50° C., and separating the N,N-bis(2-nitrobutyl)butylamine, the nitrobutene and butylamine being reacted in the molecular proportions of about 2 to 1.

11. A process for producing N,N-bis(2-nitrobutyl)-2-amino-1-ethanol which comprises adding 2-nitro-1-butene to 2-amino-1-ethanol, with stirring and cooling to maintain the reaction mixture at temperatures not substantially exceeding 50° C., and separating the N,N-bis(2-nitrobutyl)-2-amino-1-ethanol, the nitrobutene and the 2-amino-1-ethanol being reacted in the molecular proportions of about 2 to 1.

CARL T. BAHNER.

REFERENCES CITED

The following references are of record in the file of this patent:

UNITED STATES PATENTS

| Number | Name | Date |
|---|---|---|
| 2,292,212 | Dickey et al. | Aug. 4, 1942 |
| 2,381,408 | Senkus | Aug. 7, 1945 |
| 2,419,506 | Senkus | Apr. 22, 1947 |

OTHER REFERENCES

De Mauny: "Bull. Soc. Chim.," (5), vol. 4, pp. 1451–1460 (1937).

Senkus: "J. Am. Chem. Soc.," vol. 68, pp. 10–12 (Jan. 1946).

Johnson: "J. Am. Chem. Soc., vol. 68, pp. 12–14 (Jan. 1946).